US012717315B2

(12) United States Patent
Lee et al.

(10) Patent No.: US 12,717,315 B2
(45) Date of Patent: Aug. 25, 2026

(54) MANAGEMENT SYSTEM BASED ON SPATIAL ADDRESS AND WORKPIECE TRACKING SYSTEM USING SPATIAL ADDRESS

(71) Applicant: LG Energy Solution, Ltd., Seoul (KR)

(72) Inventors: Yong Gu Lee, Daejeon (KR); Sang Mu Lee, Daejeon (KR); Hyun Cheol Kwon, Daejeon (KR); Hang Soo Shin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 396 days.

(21) Appl. No.: 18/028,804

(22) PCT Filed: Aug. 4, 2022

(86) PCT No.: PCT/KR2022/011530
§ 371 (c)(1),
(2) Date: Mar. 28, 2023

(87) PCT Pub. No.: WO2023/014103
PCT Pub. Date: Feb. 9, 2023

(65) Prior Publication Data

US 2023/0333545 A1 Oct. 19, 2023

(30) Foreign Application Priority Data

Aug. 5, 2021 (KR) ........................ 10-2021-0103386

(51) Int. Cl.
*G05B 19/418* (2006.01)

(52) U.S. Cl.
CPC .................. *G05B 19/41875* (2013.01); *G05B 2219/42337* (2013.01)

(58) Field of Classification Search
None
See application file for complete search history.

(56) References Cited

U.S. PATENT DOCUMENTS 6,169,483 B1 * 1/2001 Ghaffari .................... G07F 7/06 340/568.1
7,868,760 B2 * 1/2011 Smith ................ G08B 13/2462 340/572.1

(Continued)

FOREIGN PATENT DOCUMENTS

CN 109891342 A 6/2019
JP 2003316861 A 11/2003

(Continued)

OTHER PUBLICATIONS

Extended European Search Report for Application No. 22853479.8 dated Apr. 5, 2024. 8 pgs.

(Continued)

*Primary Examiner* — Jason Lin
(74) *Attorney, Agent, or Firm* — Lerner David LLP

(57) ABSTRACT

The present technology relates to a spatial address-based management system, and the management system includes a spatial address-related information reception part configured to receive spatial address-related data assigned to each of segments generated by dividing a workspace into a plurality of rows and columns, a controller configured to process the spatial address-related data received from the spatial address-related information reception part and transmit the processed data to a spatial address-related data storage part, and the spatial address-related data storage part configured to store the spatial address-related data transmitted from the controller as spatial address data, wherein the spatial address data includes information on a unique position of the spatial address, information on a workpiece that is placed at the spatial address, and information on attributes or properties of the spatial address.

16 Claims, 9 Drawing Sheets

(56) References Cited

U.S. PATENT DOCUMENTS 9,242,798 B2* 1/2016 Guan .................. G06Q 10/087
2004/0102864 A1* 5/2004 Stack .................... A24C 5/345 700/110
2004/0139101 A1 7/2004 Watanabe et al.
2006/0187028 A1* 8/2006 Kiang .................... G06Q 10/08 340/988
2007/0135962 A1* 6/2007 Kawabe .................. G10L 13/00 704/E15.045
2008/0030359 A1* 2/2008 Smith ...................... G07C 9/28 340/686.1
2008/0065243 A1* 3/2008 Fallman ............. G05B 23/0267 700/83
2009/0134997 A1 5/2009 Godlewski
2012/0290121 A1* 11/2012 Gronbach ............... G10L 15/22 700/180
2013/0074038 A1 3/2013 Fox et al.
2013/0233922 A1* 9/2013 Schoening ..... G06Q 10/063114 235/385
2014/0022093 A1* 1/2014 Hubauer ............ G05B 19/4183 340/870.02
2014/0188263 A1 7/2014 Lee
2014/0188432 A1* 7/2014 Aljadeff .................... G01S 5/02 702/182
2014/0330433 A1* 11/2014 Ciarelli ..................... F16P 3/14 901/1
2015/0106053 A1* 4/2015 Ocal ....................... H04S 7/305 702/150
2015/0309819 A1* 10/2015 Riewrangboonya ........................ H04L 41/0816 718/1
2015/0356332 A1* 12/2015 Turner ...................... G01S 5/14 340/10.5
2016/0100289 A1* 4/2016 Mayorchik ........... G01S 5/0081 455/456.5
2016/0307459 A1* 10/2016 Chestnut ................... G06F 3/16
2017/0046654 A1 2/2017 Evers et al.
2017/0064667 A1* 3/2017 Mycek .................. H04W 64/00
2019/0026690 A1* 1/2019 Wappler ................. G06Q 50/04
2019/0243343 A1* 8/2019 Kiefer ...................... B23Q 7/12
2019/0244309 A1* 8/2019 Ottnad ................... G06Q 50/04
2022/0299622 A1* 9/2022 Hasegawa ............... G01S 13/62

FOREIGN PATENT DOCUMENTS

JP 2004315101 A 11/2004
JP 2011504865 A 2/2011
JP 2015036323 A 2/2015
JP 2020165557 A 10/2020
KR 20020042159 A 6/2002
KR 20080004053 A 1/2008
KR 20120003626 A 1/2012
KR 101177071 B1 8/2012
KR 20130008776 A 1/2013
KR 20130089751 A 8/2013
KR 20140033738 A 3/2014
KR 20140070817 A 6/2014
KR 101417528 B1 7/2014
KR 20150014570 A 2/2015
KR 20150049334 A 5/2015
KR 20150086870 A 7/2015
KR 101834936 B1 * 3/2018 ....... G06Q 10/06316
KR 101993655 B1 6/2019
WO 2019224916 A1 11/2019

OTHER PUBLICATIONS

International Search Report for PCT/KR2022/011530 mailed Dec. 1, 2022. 3 pages.

Search Report dated Jan. 26, 2026 from the Office Action for Chinese Application No. 202280006512.1 issued Jan. 30, 2026, 2 pages.

* cited by examiner

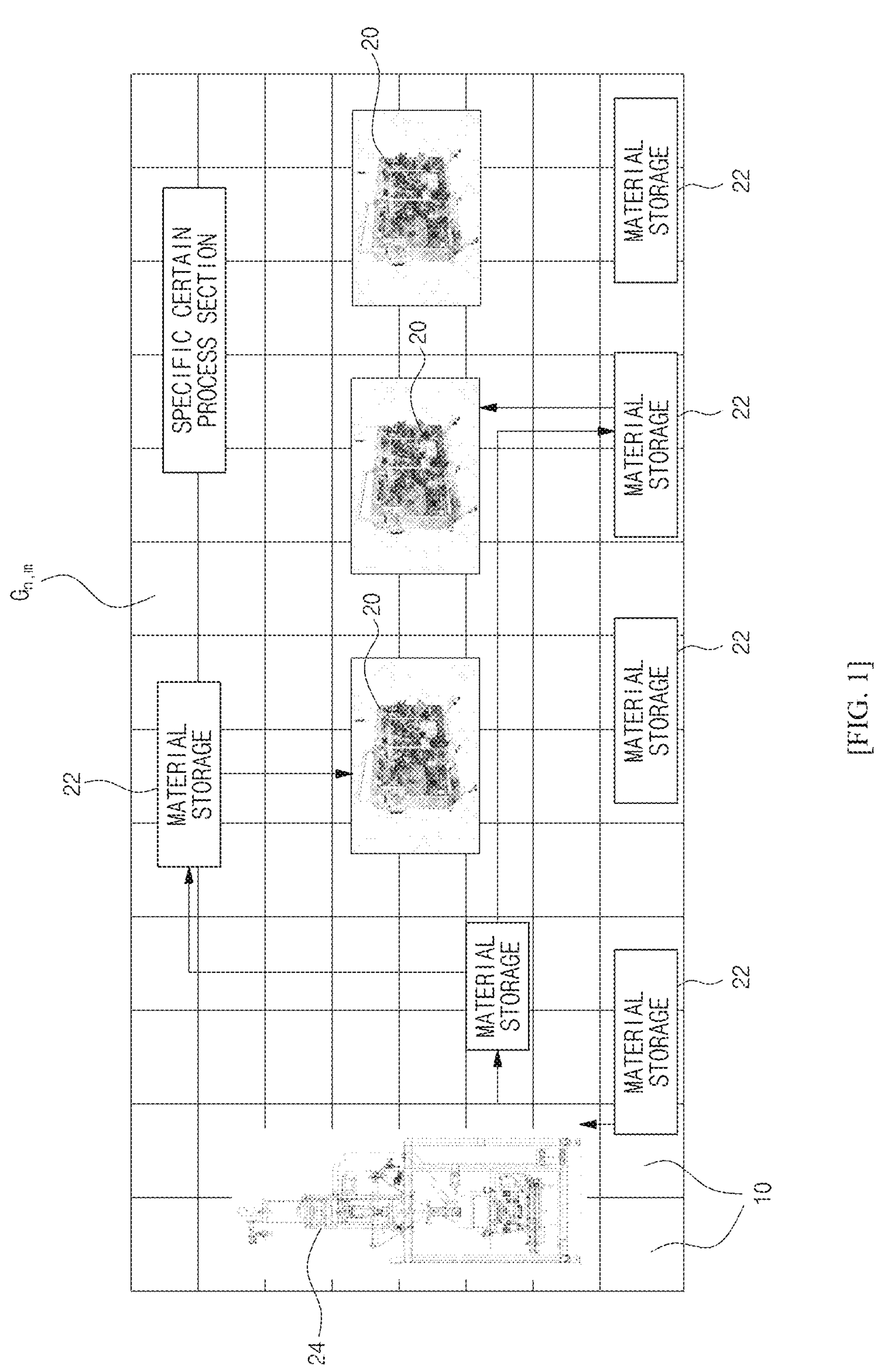
[FIG. 1]

| 12 | 14 | 16 | 18 |
|---|---|---|---|

10

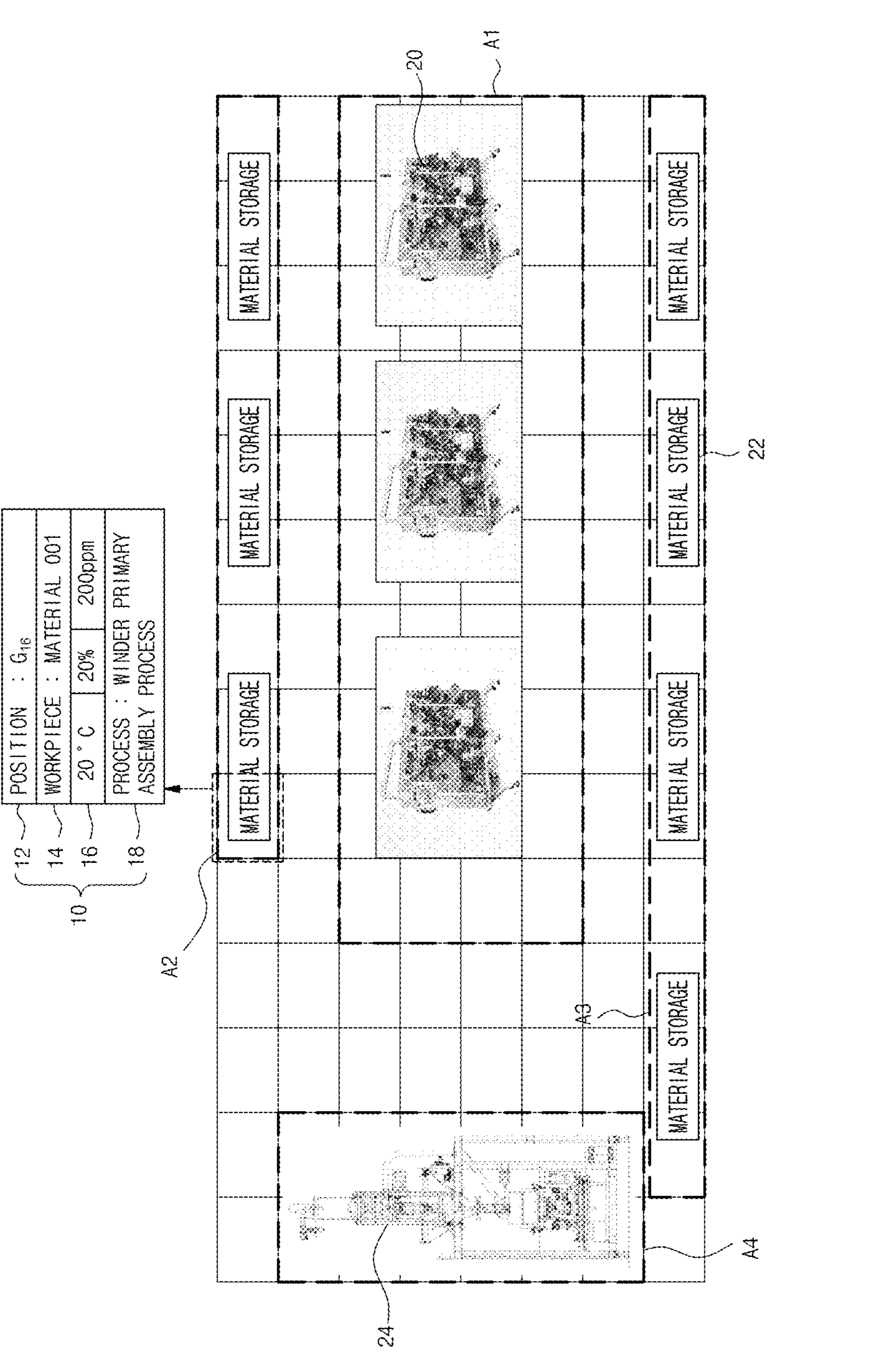
[FIG. 3A]

[FIG. 3B]

[FIG. 4]
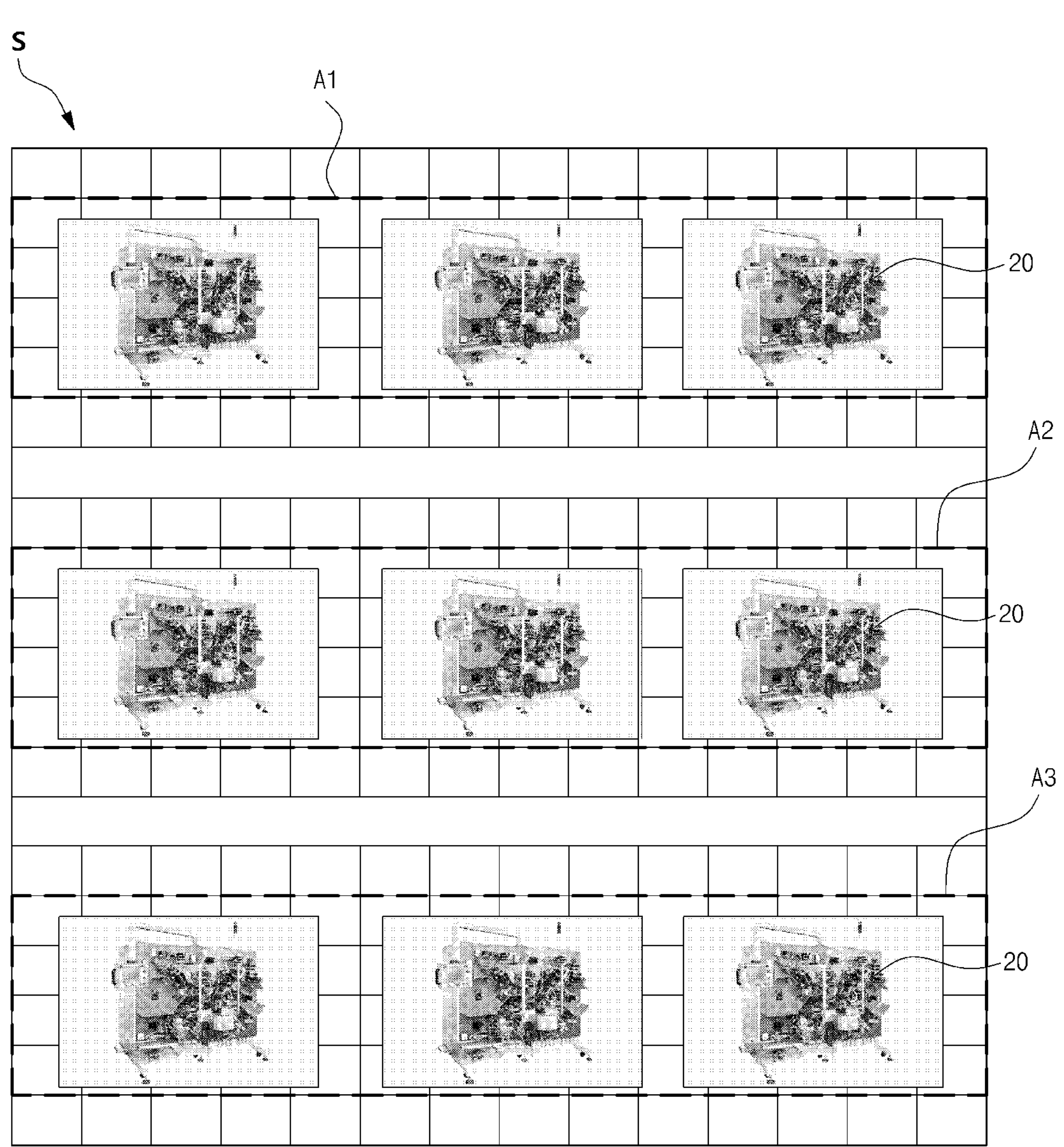

[FIG. 5]
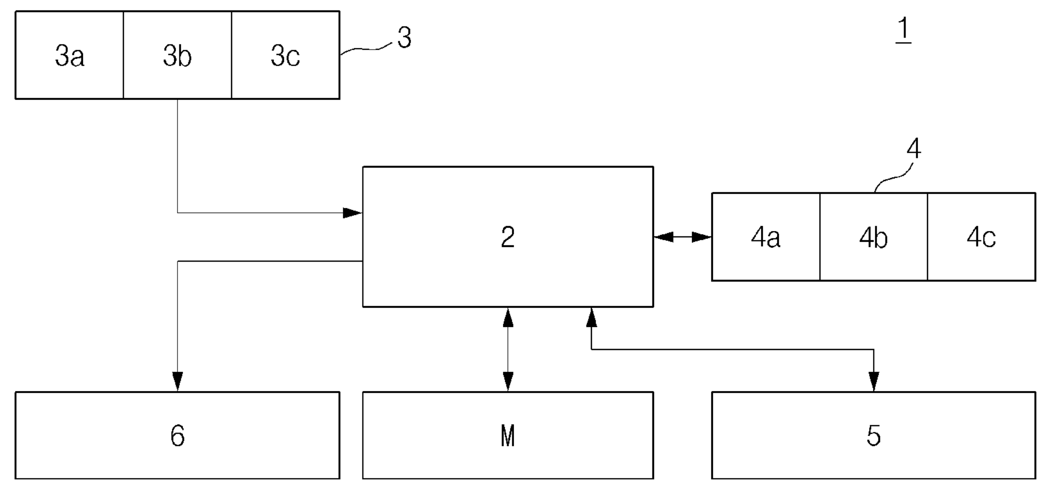

[FIG. 6]
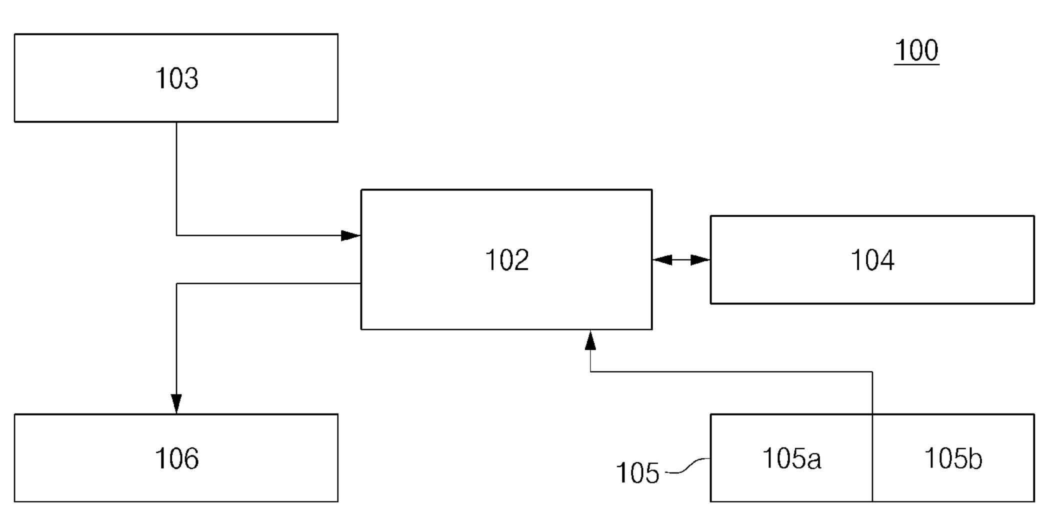

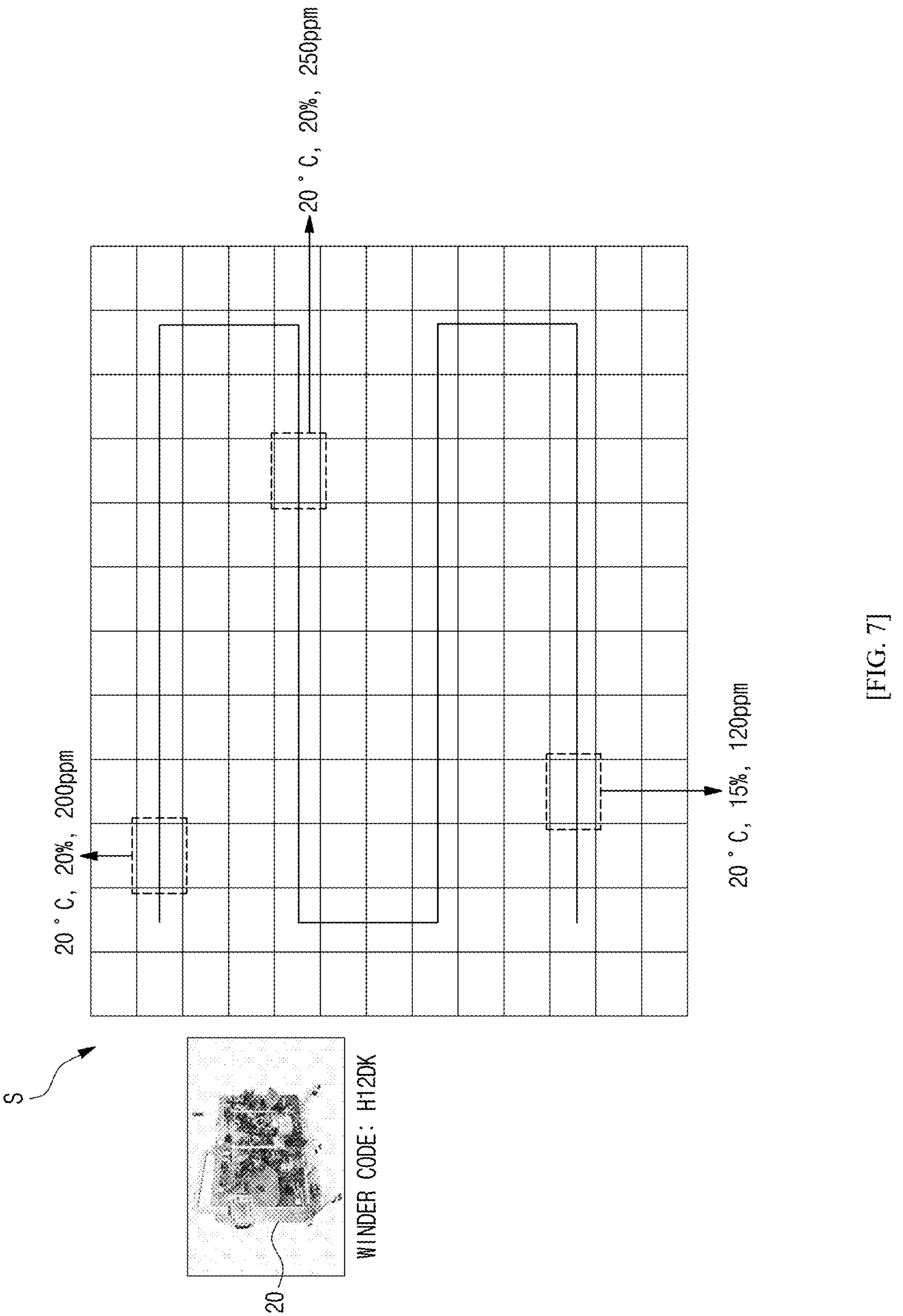
[FIG. 7]

[FIG. 8]

MANAGEMENT SYSTEM BASED ON SPATIAL ADDRESS AND WORKPIECE TRACKING SYSTEM USING SPATIAL ADDRESS

CROSS REFERENCE TO RELATED APPLICATIONS

The present application is a national phase entry under 35 U.S.C. § 371 of International Application No. PCT/KR2022/011530 filed Aug. 4, 2022 which claims priority to Korean Patent Application No. 10-2021-0103386 filed on Aug. 5, 2021 in the Republic of Korea, the disclosures of which are incorporated herein by reference.

TECHNICAL FIELD

The present invention relates to a spatial address-based management system and a workpiece tracking system using a spatial address.

This application claims the benefit of priority based on Korean Patent Application No. 10-2021-0103386, filed on Aug. 5, 2021, and the entire contents of the Korean patent application are incorporated herein by reference.

BACKGROUND ART

There are several methods of tracking positions of moving products, semi-finished products, or materials in a production process.

For example, there is a method in which an operator uses a mobile device, such as a smart phone or a tablet computer, using a geographic information system (GIS) in a factory to directly record positions of moving products, semi-finished products, or materials. In addition, there are methods such as a method in which a strength of a signal of wireless equipment such as indoor Wi-Fi and Bluetooth equipment is recorded as a GIS-based position column, and then, when a specific signal is detected, positions of moving products, semi-finished products, or materials are calculated by comparing the specific signal with the existing signal, a method in which positions of moving products, semi-finished products, or materials are calculated using trilateration based on a difference in signal strength between a sensor and a receiver that use wireless communication, a method in which triangulation is performed using a communication time and communication strength of an ultra-wideband (UWB) anchor and a UWB tag, and a method in which a magnetic field, a camera, light, simultaneous localization and mapping (SLAM), or the like is used.

However, in the case of the above methods, while it is possible to identify the position and the product by matching each other, it is difficult to manage the quality for quality improvement because the property or environment of each position that affects the quality of the product cannot be reflected.

In the case of a smart factory in which an automation system is well built, a state-of-the-art automatic logistics system is used. From the viewpoint of materials and equipment, it is necessary to improve the management of a production process and increase a yield by linking a spatial address with a GIS organically.

As a patent document related to a spatial address, for example, in Korean Laid-open Patent Application No. 10-2012-0003626, a technique for extracting outline information of a spatial address of a stockyard to accurately identify a ship block stocking space is disclosed. In Korean Laid-open Patent Application No. 10-2013-0089751, a technique for marking a spatial address mark in an outdoor workshop to display a loading position or a moving position of logistics in the workshop using the marked spatial address is disclosed. However, these patent documents have a limitation in that the techniques cannot be applied to an automatic logistics system of a new factory in that the spatial address is assigned to an outdoor space and a product placed on the spatial address is a fixed product that hardly moves.

DOCUMENT OF RELATED ART

Patent Document

Korean Laid-open Patent Application No. 10-2012-0003626
Korean Laid-open Patent Application No. 10-2013-0089751

SUMMARY

Technical Problem

An object of the present invention is to provide a spatial address-based management system and a workpiece tracking system using a spatial address, with which information on all processed workpieces and process history can be rapidly and easily checked by introducing a spatial address which is a new concept into a production process, a position of a workpiece can be accurately tracked, and the occurrence of defective products can be reduced.

Technical Solution

A management system based on a spatial address according to the present invention includes a spatial address related information reception part configured to receive spatial address-related data assigned to each of segments generated by dividing a workspace into a plurality of rows and columns, a controller configured to process the spatial address-related data received from the spatial address related information reception part and transmit the processed data to a spatial address related data storage part, and the a spatial address related data storage part configured to store the processed spatial address-related data transmitted from the controller as spatial address data, wherein the spatial address data includes information on a position of the spatial address, information on a workpiece that is placed at the spatial address, and information on attributes or properties of the spatial address.

In a specific example, the attribute or property information may include information on a temperature, moisture, or particles of the spatial address.

In a specific example, the workpiece may be one of a material, a semi-finished product, an equipment which is a production device, and a finished product.

In a specific example, the information on the attributes or properties of the spatial address data may further include process information on a process performed on the workpiece.

In a specific example, the spatial address related information reception part is configured to receive updated spatial address data at predetermined time intervals, the spatial address related data storage part is configured to store the spatial address data including past and present spatial address data, and the management system is configured to track and check a history of the spatial address over time.

As another specific example, the management system may further include a workpiece tracking part configured to receive specific workpiece information input by a manager and transmit the received specific workpiece information to the controller, wherein the controller is configured to retrieve the received specific workpiece information of the spatial address data, transmit all spatial addresses to which the corresponding workpieces has moved and transmit the spatial addresses-related data to the workpiece tracking part, and wherein the workpiece tracking part is configured to sort the received information and display at least a movement path of the workpiece.

As another specific example, the management system may further include a process interrupt part, wherein, when the information on the attributes or properties in the spatial address data is greater than or equal to a predetermined threshold value, the controller is configured to determine the information on the attributes or properties as abnormal data and transmit a driving signal to the process interrupt part, and wherein the process interrupt part is configured to perform at least one of the following in response to the driving signal:

a) automatically adjusting a corresponding process so that the information on the attributes or properties is less than the predetermined threshold value; and b) notifying that an abnormality occurs through a warning light or an alarm.

As another specific example, the spatial address related information reception part may be configured to receive information related to areas, each serving as a superordinate concept including a plurality of spatial addresses, the controller may be configured to process the received data related to the area and transmit the processed data to the spatial address related data storage part, the spatial address related data storage part may be configured to store the data related to the area, which is transmitted from the controller, as area data, and the area data may include spatial address information belonging to the area, and area attribute information indicating a characteristic or function of the corresponding area or indicating information shared by the spatial addresses.

As another specific example, the spatial address related information reception part may be configured to receive information related to sectors, each serving as the superordinate concept including a plurality of areas, the controller may be configured to process the received data related to the sector into data having a predetermined format and transmit the processed data to the spatial address related data storage part, the spatial address related data storage part may be configured to store the data related to the sector, which is transmitted from the controller, as sector data, and the sector data may include area information belonging to the sector, and sector attribute information indicating a characteristic or function of the corresponding sector or indicating information shared by the area.

As a specific example, the spatial address data may be three-dimensional (3D) spatial address data that further includes information on a height of the workpiece to be placed at the spatial address.

A workpiece tracking system based on a spatial address according to the present invention includes a spatial address related information reception part configured to receive spatial address-related data assigned to each of segments generated by dividing a workspace into a plurality of rows and columns and transmit the spatial address-related data, the controller configured to receive the transmitted spatial address-related data, process information on the spatial address-related data into data having a predetermined format and transmit the processed data to a spatial address related data storage part, the spatial address related data storage part configured to store the spatial address-related data transmitted from the controller as spatial address data, an input part configured to input a workpiece code or a spatial address code, and an output part, wherein the spatial address data includes information on a position of the spatial address, information on a workpiece that is placed at the spatial address, and information on attributes or properties of the spatial address, and the controller is configured to receive an input signal of the input device, retrieve the spatial address data, and transmits a result of the retrieval to the output device.

As a specific example, the controller may be configured to search workpiece information of the spatial address data to arrange records having the same workpiece code in a chronological order, retrieve position information of each record to generate movement path information of the workpiece based on the spatial address, and transmit the movement path information to the output device.

Alternatively, the controller may be configured to search position information of the spatial address data to arrange records having the same spatial address code in a chronological order, retrieve the remaining field of each record, generate movement path data of a workpiece with a history of passing the corresponding spatial address, generate information on attributes or properties of the spatial address over time, and transmit the generated information to the output device.

As another specific example, the workpiece tracking system may be configured to: wirelessly communicate with a portable mobile device of an operator or a manager, and display the movement path of the workpiece transmitted from the workpiece tracking system on the mobile device through a dedicated application.

The above management system or workpiece tracking system of the present invention is included in a factory.

Advantageous Effects

According to the present invention, it is possible to efficiently manage product quality while checking a movement path of a workpiece in a smart factory based on spatial addresses obtained by dividing a space.

According to the present invention, unique information related to an environment and process as well as a physical position matches a spatial address, and that data is used as data indicating attributes or properties of the spatial address, and thus it is possible to rationally perform product movement, loading and unloading of materials, and maintenance of devices in a factory.

BRIEF DESCRIPTION OF THE DRAWINGS

FIG. 1 is an exemplary configuration diagram for describing spatial addresses of the present invention.

FIG. 2 is a diagram illustrating an example of spatial address data of the present invention.

FIG. 3A is a configuration diagram for describing an area of the present invention.

FIG. 3B is a diagram illustrating an example of area data of the present invention.

FIG. 4 is a diagram for describing a sector of the present invention.

FIG. 5 is a diagram of a spatial address-based management system of the present invention.

FIG. 6 is a diagram of a workpiece tracking system of the present invention.

FIG. 7 is a diagram illustrating an example of graphics of an output part of the present invention.

FIG. 8 is a diagram illustrating systems of the present invention connected to mobile devices.

DETAILED DESCRIPTION

Hereinafter, the present invention will be described in detail with reference to the accompanying drawings. Terms and words used in this specification and claims should not be construed as being limited to commonly used meanings or meanings in dictionaries and should be construed with meanings and concepts which are consistent with the technological scope of the present invention based on the principle that the inventors have appropriately defined concepts of terms in order to describe the present invention in the best way.

It should be understood that the terms "comprise," "comprising," "include," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof. In addition, when a portion is referred to as being "connected to" another portion, it includes a case in which the portion is physically and directly or indirectly connected to another portion and a case in which the portion is connected to another portion through wireless or wired communication or is connected to another portion via an electrical signal using an electronic circuit. In addition, the terms "input" and "output" are interpreted in a broad sense including the reception and transmission of data or data as well as physical input and output.

In this specification, terms such as "upper," "lower," and "arrangement" are not meant to be limiting and should be construed as exemplifying words indicating a position, an orientation, or a physical arrangement.

Hereinafter, the present invention will be described in detail.

First Embodiment

First, a concept of a spatial address of the present invention will be described with reference to FIG. 1. Although a "spatial address" is also usually denoted as "LOT," the spatial address of the present invention is different from the existing lot number in that the spatial address includes attribute or property information. The attribute or property information is information related to processing, production, and transport conditions that are essential for controlling product quality or information related to a process in which a product is placed.

Although there are various objects or entities in a production or processing process, the objects or entities are to be construed in the broadest sense to include at least materials, semi-finished products, finished products, and devices that are means of production. In the following descriptions, although the objects or entities are collectively referred to as "workpieces," "processed workpieces," or "objects," the meanings that they encompass are the same.

In FIG. 1, for example, three winders 20, which are examples of a semi-finished product, are positioned in the middle of a workspace. Materials 22 for being placed on or added to the winders 20 are disposed in appropriate places in the workspace. As indicated by arrows, the materials 22 are positioned in a plurality of appropriate waiting places for the materials 22 being loaded into the winders 20 through various paths after passing through a vacuum drying (VD) device 24.

A spatial address G of the present invention is a cell of a grid or a segment generated by dividing the workspace into a plurality of rows and columns. In the illustrated example, the workspace is divided into 8 rows and 13 columns, and thus 104 spatial addresses G are provided. A code indicating a row and column is assigned to each spatial address G. In this case, the winder 20 at a left side is positioned at spatial addresses $G_{45}$, $G_{46}$, $G_{47}$, $G_{55}$, $G_{56}$, $G_{57}$, $G_{65}$, $G_{66}$, and $G_{67}$. The material 22 at an upper side is positioned at spatial addresses $G_{15}$, $G_{16}$, $G_{17}$, $G_{25}$, $G_{26}$, and $G_{27}$. In addition, the VD device 24 is positioned at spatial addresses $G_{21}$, $G_{22}$, $G_{31}$, $G_{32}$, $G_{41}$, $G_{42}$, $G_{51}$, $G_{52}$, $G_{61}$, $G_{62}$, $G_{71}$, and $G_{72}$. Spatial address data 10 matches each spatial address G as will be described below.

As illustrated in FIG. 1, for all processes and operations in which the workpiece is present, by assigning the spatial addresses G to the workspace, and positions of all the workpieces, such as semi-finished products, materials, devices, and finished products, which are necessary for the production of final products may be displayed. An object loaded in the spatial addresses G may not move for a long time or may move continuously in real time, but the physical positions of the spatial addresses G are fixed. Therefore, it is possible to obtain all information on the workpieces which are currently positioned at the spatial addresses G or passed in the past. That is, it is possible to efficiently manage the production process by easily tracking the history of the object based on the spatial addresses G.

In order to detect or identify the object positioned at the spatial addresses G, a sensor or an imaging device may be used or data (e.g., barcodes) of a conventional process management server may be used. Alternatively, the above-described geographic information system (GIS), an automated guided vehicle (AGV) logistics system for transferring materials or semi-finished products, a trilateration method, a magnetic field, light, simultaneous localization and mapping (SLAM), or the like may be used, but the present invention is not particularly limited thereto.

Figure 2:
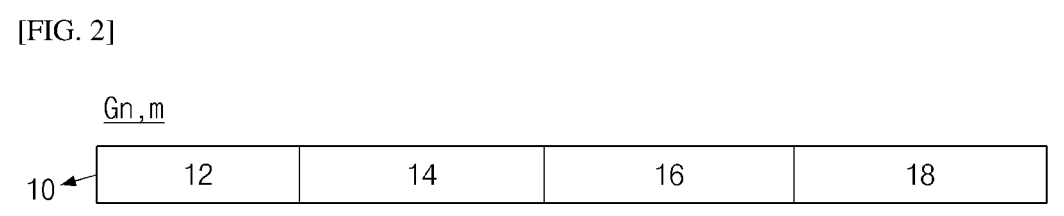

A structure of the spatial address data 10 of the present invention will be described with reference to FIG. 2. For convenience of description, although the structure is described based on a record of a spatial address $G_{nm}$, indicating an $n^{th}$, row and an $m^{th}$ column, the same description applies to all the spatial addresses G.

The present invention is characterized in that, in addition to a physical spatial position of the spatial address G, information on the workpiece and information indicating the attributes or properties of the spatial address G are recorded in conjunction with each other in response to the spatial address G. Therefore, the spatial address information 10 includes, in addition to position information 12, workpiece information 14, environment information 16 such as moisture, temperature, particles, and the like, and process information 18. The position information 12 is a code that is information on a physical position in the workspace of the spatial address G. The workpiece information 14 is information on an object placed at the corresponding spatial address G, such as a semi-finished product, a material, a device, a finished product, or the like. The environment information 16 is selected from among parameters which are necessary for the execution or monitoring of a process in which the object is placed, or which affects the quality. The process information 18 is information related to the process (e.g., "winder primary assembly process") in which the object is placed. In the case of materials and semi-finished products, the spatial address data 10 includes information related to warehousing, piling up, and moving, and information related to warehousing, arranging, and moving time points. In the case of equipment, the spatial address data 10 includes information on equipment replacement and information on operating time.

As described above, this information may be automatically recorded using a sensor, an imaging device, or a process management server, or may be manually input by a manager.

While the spatial address data 10 is updated at a predetermined time interval, the past and present spatial address data 10 is stored. Therefore, it is possible to track and check the history of the spatial address G over time.

The above illustrates an example of the spatial address data 10, and fields of the spatial address data 10 may be variously changed or added in some factories or processes.

In the present invention, unique information related to the environment and process as well as the physical position matches the spatial address G, and the information is used as information indicating the attributes or properties of the spatial address G, and thus it is possible to easily check and inspect the overall layout and design inside the factory, such as, in addition to individual quality control, movement of materials and semi-finished products within the factory, loading and unloading of processed workpieces, shipment of finished products, positions of devices, etc.

Although the spatial addresses G have been described above in planar coordinates, three-dimensional (3D) spatial addresses may be generated by adding a height parameter. The height parameter is needed in the case in which process management is required because the height acts as a parameter, such as when there are multiple layers of shelves in a workspace or when workpieces are gradually stacked or unloaded from the shelves. In this case, the spatial address data 10 may further include height information. The height information may be obtained by setting coordinates for each height or setting a detailed spatial address.

An area serving as a region of a superordinate concept of the spatial address G of the present invention will be described with reference to FIG. 3.

In FIG. 3A, an area is divided into an area A1 including all spatial addresses G of a space in which winders 20 are positioned, an area A2 including all spatial addresses G of a space in which materials 22 at an upper side are positioned, an area A3 including all spatial addresses G of a space in which materials 22 at a lower side are positioned, and an area A4 including all spatial addresses G of a space in which a VD device 24 is positioned. As can be seen from the fact that the semi-finished products are displayed in the area A1, the materials are displayed in the areas A2 and A3, and the device is displayed in the area A4, the areas A1, A2, A3, and A4 have different properties. In this way, the area is given based on the flow of the process and the object, but the area may be variously changed, such as physically dividing the area according to the region covered by the sensor and the like. An area A may not be given to spatial addresses G of empty spaces or passages between the areas A, or the spatial addresses G may be collectively processed as a blank area.

The area A of the present invention has a superordinate concept including a plurality of spatial addresses G and may have a structure of area data 30 as illustrated in FIG. 3B for convenient process monitoring. The area data 30 basically includes spatial address data 32 belonging to the area, and area attribute information 34 indicating a characteristic or function of the corresponding region or indicating information (e.g., the same winder 20) shared in common by the spatial addresses G. The area attribute information 34 may also include manuals required for maintenance of the corresponding region or maintenance of equipment or information on operating conditions (concentration of particles, temperature, etc.) which are essential to the process.

FIG. 4 illustrates a sector S serving as a region, which is a superordinate concept of the area A by expanding the concept of the area A. In the illustrated example, the sector S indicates a region including the same processed workpieces, as including areas A1, A2, and A3 assigned for each row in a workspace for parallel supply by arranging the same winders 20 in three rows. Alternatively, the sector S may be divided based on a specific layer, a specific space, or the same large device. On the other hand, the sector S may be assigned to each of operations constituting a process. Sector data, like the area data 30, includes area data, and sector data attribute information indicating a characteristic or function of the corresponding sector or indicating information (e.g., the same layer) shared in common by the area A.

The area A and the sector S have wider concepts than the spatial address G, and thus are more efficient than the spatial address G in terms of macro management of the production process. However, in the present invention, although the spatial address G is essential, the area A or the sector S is not necessarily provided according to the factory or process conditions or working environment. On the other hand, various changes, such as adding a higher group onto the sector S, constructing a 3D area or 3D sector, or the like, may be made.

Next, a spatial address-based management system 1 of the present invention will be described with reference to FIG. 5. The spatial address-based management system 1 is installed in a factory such as a smart factory.

The management system 1 of the present invention includes a controller 2, a spatial address-related information reception part 3, a spatial address-related data storage part 4, a workpiece tracking part 5, a process interrupt part 6, and a memory M.

The spatial address-related information reception part 3 includes a spatial address-related information reception part 3_a_, an area information reception part 3_b_, and a sector information reception part 3_c_. As described above, the spatial address-related information reception part 3 may receive information obtained using a sensor, an imaging device, or a process management server, information detected by a GIS, an AGV logistics system for transferring materials or semi-finished products, a trilateration method, a magnetic field, light, SLAM, or the like, or information related to a spatial address G, an area A, and a sector S which are manually input by a manager, and transmit the information to the controller 2.

The controller 2 processes the transmitted information into data having a format which is set to match a data structure of the spatial address-related data storage part 4 and transmits the processed data to the spatial address-related data storage part 4. The spatial address-related data storage part 4 includes a spatial address data storage part 4_a_, an area data storage part 4_b_, and a sector data storage part 4_c_. A data structure written in each storage part is the same as described above.

The workpiece tracking part 5 receives information on a specific workpiece, which is input by the manager through an input part (not illustrated), and transmits the received information to the controller 2. The controller 2 retrieves or reads data of the spatial address-related data storage part 4. When the workpiece information 14 is retrieved with a key, for example, the same barcode, from the spatial address data 10, all the spatial addresses G to which the corresponding workpiece has moved, and production and environment information related to the spatial addresses G may be obtained. This data is transmitted to the workpiece tracking part 5, and the workpiece tracking part 5 sorts the received data and displays the sorted data as history data of the workpiece, for example, graphics data, on a display (not illustrated). The manager may check whether the workpiece has gone through the appropriate production process and whether there are any negative factors affecting quality during moving. Furthermore, when it is checked that the specific workpiece is defective, the manager may identify a cause of the defect using the workpiece tracking part 5.

The memory M stores parameters affecting the product quality, and threshold values related thereto. For example, when a temperature is 200° C. or higher or a maximum allowable value of particles is 100 parts-per-million (PPM), or when a processed workpiece is delayed for one minute or more at a specific spatial address G without moving, threshold value data related thereto is stored in the memory M. The controller 2 refers to the memory M while transmitting data of the spatial address-related information reception part 3 to the spatial address-related data storage part 4, and when the data written in the spatial address data 10 is greater than or equal to a threshold value, the controller 2 determines that the data is abnormal, and transmits a driving signal to the process interrupt part 6. The process interrupt part 6 may automatically adjust the corresponding process so that the data of the attribute or property information is less than a predetermined threshold value in response to the driving signal. For example, the process interrupt part 6 may instruct to lower the temperature of the corresponding process or the temperature of a specific place of a factory where the corresponding process is performed so that the temperature is less than 200° C. That is, the process interrupt part 6 may operate a temperature adjustment system of the factory to lower the temperature. Alternatively, when the maximum allowable value of the particles is 100 PPM or when the particles exceed 100 PPM, a dust collecting device or a dust exhaust device is operated to lower the threshold value of the particles. Alternatively, when the processed workpiece is delayed for one minute or more at a specific spatial address G without moving, an instruction is given to a processed workpiece moving device or device to move the processed workpiece rapidly. For example, the process interrupt part 6 may be an integrated automatic control system or a production management system of the factory. Alternatively, the process interrupt part 6 may be an individual control system of the specific process and/or the device included in the system. That is, in the case in which the spatial address-based management system 1 is the production management system of the factory, the process interrupt part 6 may be a control system of a specific process. Therefore, when the spatial address-related data is received and the driving signal is provided by the controller referring to the memory, the process interrupt part 6 may automatically adjust the data of the attribute or property information of the corresponding process to be less than the threshold value, and implement a smart factory. That is, according to the present invention, the automatic factory control or automatic quality control of the process interrupt part 6 may be performed in response to the driving signal of the controller.

In addition, in response to the driving signal of the controller, the process interrupt part 6 may notify the operator of the spatial address-based management system 1 or the manager for the site of the occurrence of an abnormality through a warning light or an alarm. Therefore, in the abnormal processing operation of the product, the corresponding process may be blocked and suppressed by temporarily suspending the process, taking appropriate measures, and then returning to the normal state.

In the management system 1 of the present invention, although the controller 2, the spatial address-related information reception part 3, and the spatial address-related data storage part 4 are always driven by default so that the spatial address data is built in real time, the workpiece tracking part 5 may be driven only when there is an input or request from the operator. Further, the management system 1 matches spatial address passing history data for the workpiece, for example, for each product code, based on the spatial address data or the like, to pre-store the spatial address passing history data in a database (DB), and when there is a request from the operator, various changes such as immediately transmitting the data and the like are performed.

Although an example of the management system 1 including the area A and the sector S has been described above, the same description may apply to a system in which only a spatial address G is built.

Second Embodiment

The workpiece tracking part 5 of the present invention is not included in the management system 1, and may be built as a separate server connected to the management system 1 or may be built inside a factory as an independent workpiece tracking system 100. The workpiece tracking system 100 according to the latter will be described with reference to FIG. 6 based on spatial address data 10.

The workpiece tracking system 100 includes a controller 102, a spatial address-related information reception part 103, a spatial address-related data storage part 104, an input part 105, and an output part 106.

The spatial address-related information reception part 103 receives information related to a spatial address G which is obtained using a sensor, an imaging device, or a GIS or is manually input by a manager, and transmits the received information to the controller 102. The controller 102 processes the transmitted information into data having a preset format and transmits the processed data to the spatial address-related data storage part 104. The spatial address data 10 described in the first embodiment is stored in the spatial address-related data storage part 104.

The input part 105 is an implement with which the manager can perform manual input, such as a panel or a keyboard, but the present invention is not particularly limited thereto. The input part 105 includes a first input part 105*a* for inputting a workpiece code with a key, and a second input part 105*b* for inputting a spatial address G code. The spatial address G code may be designated as a range value.

The output part 106 is a display device such as a display, but the present invention is not particularly limited thereto.

The controller 102 of the present invention receives an input signal of the input part 105, retrieves the spatial address-related data storage part 104, and transmits a result of the retrieval to the output part 106.

Specifically, when the manager inputs a workpiece code through the first input part 105*a*, the controller 2 searches for the workpiece information 14 of the spatial address data 10 and arranges records having the same workpiece code in chronological order. Then, the controller 2 retrieves the position information 12 of each record, generates movement path information of the workpiece based on the spatial address G, and generates attribute or property information according to the movement path based on the environment information 16 and the process information 18 of each spatial address G. The data generated in this way is transmitted to the output part 106 and displayed on a display device, for example, as graphics data. FIG. 7 illustrates an example of an output result obtained by inputting a code of a winder 20 as a workpiece.

When the manager inputs a spatial address code through the second input part 105*b*, the controller 2 retrieves the position information 12 of the spatial address data 10 and arranges records having the same spatial address code in chronological order. Then, the controller 2 retrieves the remaining fields of each record, and generates movement path information of the workpiece with a history of passing the corresponding spatial address G, and attribute or property information of the spatial address G over time. The data generated in this way is transmitted to the output part 106 and displayed on the display device, for example, as graphics data.

As described above, according to the workpiece tracking system 100 of the present invention, it is possible to check whether the appropriate process has been performed while tracking the movement path of the specific workpiece, and to check the processing environment and history of the corresponding area based on the spatial address G, and thus it is possible to conveniently manage the production process, and accurately monitor the process without errors through cross check.

Third Embodiment

Figure 8:
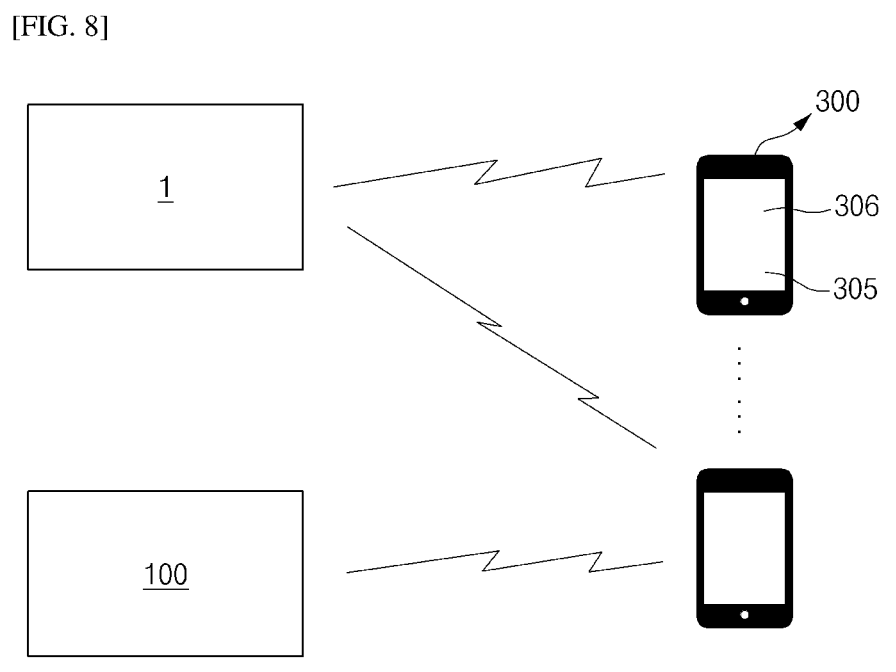

The spatial address-based management system 1 in the first embodiment and the workpiece tracking system 100 in the second embodiment may be connected to one or more mobile devices 300 such as smartphones, as illustrated in FIG. 8. In this case, since a plurality of managers or operators may directly identify the position of the workpiece in the field through their respective mobile devices 300 while sharing the server, the production process can be conveniently managed.

When described based on the case in connection with the workpiece tracking system 100, a dedicated app is installed in the mobile device 300, and the mobile device 300 wirelessly communicates with the workpiece tracking system 100 through an input part 305 and an output part 306. When an operator inputs a workpiece code or a spatial address code through the input part 305, related information generated by performing the same process as described in the second embodiment is transmitted and displayed on the output part 306. In order to take advantage of the portability of the mobile device, various changes, such as extracting and displaying only the movement path of the workpiece and the like, may be made.

While the present invention has been described with reference to particular exemplary embodiments, it will be understood by those of skilled in the art that various changes and modifications may be made without departing from the spirit and scope of the present invention.

Therefore, the embodiments disclosed above and in the accompanying drawings should be considered in a descriptive sense only and not for purposes of limitation. The scope of the present invention is defined not by the detailed description of the present invention but by the appended claims, and encompasses all equivalents that fall within the scope of the appended claims.

REFERENCE NUMERALS

1: Spatial Address Management System
10: Spatial Address Data
12: Position Information
14: Workpiece Information
16: Environment Information
18: Process Information
100: Workpiece Tracking System
300: Mobile Device
G: Spatial Address
A: Area
S: Sector

The invention claimed is:

1. A management system based on a spatial address, the management system comprising:

a controller configured to process spatial address-related data assigned to each of segments generated by dividing a workspace into a plurality of rows and columns; and memory storing the spatial address-related data transmitted from the controller as spatial address data, wherein the spatial address data includes information on a position of the spatial address at one row of the plurality of rows and one column of the plurality of columns, information on a workpiece that is placed at the spatial address, and information on one or more physical environments of the spatial address; and wherein the management system is configured to:

generate graphical data representing movement path information of the workpiece with a history of passing the spatial address and the information on the one or more physical environments of the spatial address and time when the workpiece is present in the spatial address; and automatically control the one or more physical environments of the spatial address based on the information on the one or more physical environments of the spatial address.

2. The management system of claim 1, wherein the information on the one or more physical environments includes information on a temperature, moisture, or particles of the spatial address.

3. The management system of claim 1, wherein the workpiece is one of a material, a semi-finished product, an equipment which is a production device, and a finished product.

4. The management system of claim 2, wherein the information of the workpiece further includes process information on a process performed on the workpiece.

5. The management system of claim 1, wherein the spatial address-related data includes updated spatial address data at predetermined time intervals, wherein the memory is configured to store the spatial address data including past and present spatial address data, and wherein the management system is configured to track and check a history of the spatial address over time.

6. The management system of claim 1, wherein the management system is configured to receive specific workpiece information input by a manager and transmit the received specific workpiece information to the controller, wherein the controller is configured to retrieve the received specific workpiece information of the spatial address data, transmit spatial addresses to which the corresponding workpiece has moved, and wherein the management system is further configured to sort the spatial addresses and display at least a movement path of the workpiece based on the spatial addresses.

7. The management system of claim 1, wherein, when the information on the one or more physical environments included in the spatial address data is greater than or equal to a predetermined threshold value, the controller is configured to determine the information on the one or more physical environments as abnormal data and transmit a driving signal to the process interrupt part, and wherein the management system is configured to perform at least one of the following in response to the driving signal:

a) automatically adjusting a corresponding process so that the information on the one or more physical environments is less than the predetermined threshold value; and b) notifying that an abnormality occurs through a warning light or an alarm.

8. The management system of claim 1, wherein:

the management system is configured to receive information related to areas, each serving as a superordinate concept including a plurality of spatial addresses, wherein the controller is configured to process the received information related to an area of the areas into data having a predetermined format and transmit the processed data to the memory;

wherein the memory is configured to store the area-related data transmitted from the controller as area data; and wherein the area data includes spatial address information belonging to the area, and area attribute information indicating a characteristic or function of the area or indicating information shared by the plurality of spatial addresses.

9. The management system of claim 1, wherein:

the management system is configured to receive information related to sectors, each serving as the superordinate concept including a plurality of respective areas;

wherein the controller is configured to process the received data related to a sector of the sectors into data having a predetermined format and transmit the processed data to the memory;

wherein the memory is configured to store the sector-related data transmitted from the controller as sector data; and wherein the sector data includes area information belonging to the sector, and sector attribute information indicating a characteristic or function of the sector or indicating information shared by the plurality of respective areas.

10. The management system of claim 1, wherein the spatial address data is three-dimensional (3D) spatial address data that further includes information on a height of the workpiece to be placed at the spatial address.

11. A factory including the system of claim 1.

12. A workpiece tracking system based on a spatial address, the workpiece tracking system comprising:

a controller configured to receive transmitted spatial address-related data, process information on the spatial address-related data and transmit the processed information on the spatial address-related data; and memory configured to receive the transmitted processed information on the spatial address-related data and store the information on the spatial address-related data as spatial address data;

wherein the controller is further configured to input a workpiece code or a spatial address code, and retrieve the spatial address data based on the workpiece code or the spatial address code and display a result of the retrieved spatial address data, and wherein the spatial address data includes information on a position of the spatial address at one row of a plurality of rows and one column of a plurality of columns, information on a workpiece that is placed at the spatial address, and information on one or more physical environments of the spatial address; and wherein the workpiece tracing system is configured to:

generate graphical data representing movement path information of the workpiece with a history of passing the spatial address and the information on the one or more physical environments of the spatial address and time when the workpiece is present in the spatial address; and automatically control the one or more physical environments of the spatial address based on the information on the one or more physical environments of the spatial address.

13. The tracking system of claim 12, wherein, the controller is configured to search workpiece information of the spatial address data to arrange records having a same workpiece code in a chronological order, retrieve position information of each record to generate movement path information of the workpiece based on the spatial address, and transmit the movement path information to a display.

14. The tracking system of claim 12, wherein, the controller is configured to search position information of the spatial address data to arrange records having the a spatial address code in a chronological order, retrieve a remaining field of each record, generate information on a workpiece with a history of passing the spatial address, information on the one or more physical environments of the spatial address over time, and transmit the generated information to the display.

15. The tracking system of claim 12, wherein:

the workpiece tracking system is configured to:

wirelessly communicate with a portable mobile device of an operator or a manager; and display the movement path of the workpiece transmitted from the workpiece tracking system on the mobile device through a dedicated application.

16. A factory including the system of claim 12.

* * * * *